United States Patent [19]

Iwasawa et al.

[11] 3,919,352
[45] Nov. 11, 1975

[54] POWDER COATING COMPOSITIONS

[75] Inventors: Maozumi Iwasawa; Minoru Shibata; Tadashi Watanabe; Ichiro Yoshihara, all of Hiratsuka, Japan

[73] Assignee: Kansai Paint Company, Ltd., Japan

[22] Filed: May 29, 1973

[21] Appl. No.: 364,533

[30] Foreign Application Priority Data

May 31, 1972 Japan.............................. 47-54551
May 31, 1972 Japan.............................. 47-54552

[52] U.S. Cl. .......... 260/856; 260/42.21; 260/42.44; 260/249.6; 260/851; 427/180; 428/502; 260/42.54; 260/67.5
[51] Int. Cl.² .................. C08L 61/20; C08L 61/26
[58] Field of Search....... 260/856, 851, 249.6, 41 C, 260/41 R

[56] References Cited
UNITED STATES PATENTS

| | | | |
|---|---|---|---|
| 3,160,608 | 12/1964 | Polansky et al.................. | 260/249.6 |
| 3,304,280 | 2/1967 | Senior................... | 260/851 |
| 3,428,479 | 2/1969 | Dobransky......................... | 260/856 |
| 3,806,480 | 4/1974 | Leonard............................. | 260/856 |

OTHER PUBLICATIONS

"Powder Coatings: Why–How–When," J. Paint Technology, Vol. 44, Feb. 1972, pp. 30–37.

*Primary Examiner*—Murray Tillman
*Assistant Examiner*—J. Ziegler
*Attorney, Agent, or Firm*—Larson, Taylor and Hinds

[57] ABSTRACT

Powder coating composition comprising 4 to 20 percent by weight of a hexamethylolmelamine derivative and 96 to 80 percent by weight of an acrylic resin having a softening point of 65° to 130°C and an acid value of 5 to 20 and containing 0.4 to 2.0 mols of free hydroxyl group per kilogram of the resin, said hexamethylolmelamine derivative being at least one of etherified products of hexamethylolmelamine which have CH₃O- and RO- groups substituted for the hydroxyl group in the methylol group of hexamethylolmelamine, the average total number of the CH₃O- and RO- groups being 5.5 to 6.0 per melamine nucleus, the average number of the RO- group being 0.5 to 3.0 per melamine nucleus, wherein RO is

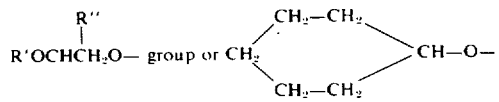

group, R' being an alkyl group having 1 to 4 carbon atoms and R" being hydrogen atom or methyl group.

10 Claims, No Drawings

POWDER COATING COMPOSITIONS

This invention relates to a powder coating composition, more particularly to an improved thermosetting powder coating composition containing a specific melamine derivativve and an acrylic resin.

Thermosetting powder coating compositions containing an acrylic resin and a melamine derivative, namely "melamine-acrylic resin", have already been known. Used as the melamine derivative in the composition is a hexakisloweralkoxymethylmelamine obtained by etherifying hexakismethylolated melamine with a lower alcohol. Further used as the acrylic resin is one having free hydroxyl groups, since it is necessary to bake the powder coating composition to subject the acrylic resin and melamine to crosslinking.

The conventional powder coating composition incorporating the melamine-acrylic resin is of poor curing properties and, when baked at a usual temperature of about 160° to 170°C, it gives a coating film which is poor in flexibility and in solvent resistance. Accordingly, the coating composition must be baked at a temperature at least about 40° to 50°C higher than the usual baking temperature. However, the high-temperature baking is not only disadvantageous from the viewpoint of heat economy but also has the serious drawback of being unapplicable to soldered products since the solder will be melted during baking. In fact, it has the fatal drawback that it is almost unapplicable to automotive components. Moreover, during baking, the coating film incorporating the melamine-acrylic resin gives off a gas which tends to form vents when escaping from the coating film that has been rendered highly viscous, giving rise to so-called "popping". The susceptibility to popping makes it impossible to apply the coating composition to a great thickness and lowers the smoothness of the coating film obtained.

To prevent the occurrence of popping, it has been known to use a mixed product obtained by etherifying hexamethylolmelamine with a mixture of lower and higher aliphatic alcohols. According to this method, the occurrence of popping reduces as the length of chain of the higher alcohol used increases, but the resistance to "blocking" lowers with the increase in the length of chain thereof. The term "blocking" means that particles in the coating composition coheres one another during storage. Consequently, if the occurrence of popping is reduced to a satisfactory extent, the resistance to blocking will be deteriorated markedly, rendering the powder coating composition almost unapplicable to practical use. In addition, the use of such melamine derivative impairs the resistance to solvent and flexibility, making it still necessary to bake the composition at a high temperature of at least 200°C.

An object of this invention is to provide a powder coating composition from which coating films having excellent solvent resistance and flexibility can be formed at a usual baking temperature.

Another object of this invention is to provide a powder coating composition having excellent curing properties.

Another object of this invention is to provide a powder coating composition which is not susceptible to the occurrence of popping.

Another object of this invention is to provide a powder coating composition which can be applied to a great thickness.

Another object of this invention is to provide a powder coating composition capable of forming a coating film having excellent surface smoothness.

Another object of this invention is to provide a powder coating composition having an excellent resistance to blocking.

Still another object of this invention is to provide a powder coating composition which can be applied, free of any trouble, to soldered materials, especially to automotive components.

These and other objects of this invention will be apparent from the following description.

The objects of this invention can be accomplished by using, in place of the conventional melamine derivatives, a specific modified melamine conjointly with acrylic resin in a specified proportion.

The present invention provides a powder coating composition comprising 4 to 20 percent by weight of a hexamethylolmelamine derivative and 96 to 80 percent by weight of an acrylic resin having a softening point of 65 to 130°C and an acid value of 5 to 20 and containing 0.4 to 2.0 mols of free hydroxyl group per kilogram of the resin, said hexamethylolmelamine derivative being at least one of the etherified products of hexamethylolmelamine which have $CH_3O-$ and $RO-$ groups substituted for the hydroxyl group in the methylol group of hexamethylolmelamine, the average total number of the $CH_3O-$ and $RO-$ groups being 5.5 to 6.0 per melamine nucleus, the average number of the $RO-$ group being 0.5 to 3.0 per melamine nucleus, wherein $RO$ is

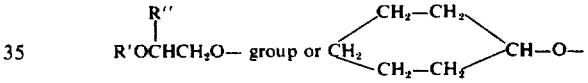

group, $R'$ being an alkyl group having 1 to 4 carbon atoms and $R''$ being hydrogen atom or methyl group.

The present powder coating composition containing the above specific hexamethylolmelamine derivative and acrylic resin can be applied to any desired thickness and easily cured at a usual baking temperature without any occurrence of popping to produce a smooth-surfaced coating film which is excellent in solvent resistance, in flexibility and in resistance to blocking.

The etherified products of hexamethylolmelamine to be used according to this invention must be those having the above-specified substituents in the specified range of number in the melamine nucleus. For instance, if the average total number of $CH_3O-$ and $RO-$ groups per melamine nucleus ($RO$ being the same as defined before) contained in the etherified product is less than 5.5, the resulting composition will not exhibit improved solvent resistance and flexibility and is liable to cause popping during baking operation. Further even in the case where the etherified product contains 5.5 to 6.0 substituted $CH_3O-$ and $RO-$ groups per melamine nucleus on the average, the resulting composition will exhibit poor solvent resistance and low flexibility if the average number of $RO-$ group per melamine nucleus is less than 0.5. If the average number of the $RO-$ group per melamine nucleus is more than 3.0, a low resistance to blocking will result, rendering the powder coating composition ineffective to use.

The etherified products of hexamethylolmelamine to be used in this invention can be prepared by various methods. For example, the etherified product of hexamethylolmelamine is produced easily by subjecting hexakismethoxymethylmelamine with an alcohol having the formula of ROH wherein RO is as defined above to ether exchange reaction.

The alcohols to be used include alkylene glycol monoalkyl ethers having the formula of

(R' and R'' being as defined before) and cyclohexanol having the formula of

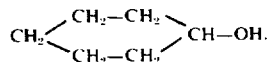

Examples of the alkylene glycol monoalkyl ethers are ethylene glycol monomethyl ether, ethylene glycol monoethyl ether, ethylene glycol mono-n-propyl ether, ethylene glycol mono-iso-propyl ether, ethylene glycol mono-n-butyl ether, ethylene glycol-iso-butyl ether, ethylene glycol mono-sec-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-iso-propyl ether, ethylene glycol mono-sec-butyl ether, etc. The ether exchange reaction can be carried out at a temperature of not higher than 100°C in the presence of a strong acid catalyst such as hydrochloric acid, nitric acid, sulfuric acid, phosphoric acid or the like. After the reaction the unreacted alcohol is removed under a reduced pressure in the presence of a weak alkali. The hexakismethoxymethylmelamine used for the reaction may preferably be pure hexakismethoxymethylmelamine, but it is possible to use a methylether of hexamethylolmelamine having at least 5.5 methoxy groups per melamine nucleus on the average.

The acrylic resins to be used in this invention must be those having a softening point of 65° to 130°C and an acid value of 5 to 20 and containing 0.4 to 2.0 mols of free hydroxyl group per kilogram of the resin.

The softening point referred to in this invention was determined according to JIS-K-2513 (ring and ball method). The mol number of hydroxyl group was calculated by the following equation:

$$\text{Mol number of free hydroxyl group contained in acrylic resin (mol/kg)} = \frac{\frac{\text{Total weight (g) of monomer containing hydroxyl group (W)}}{\text{Molecular weight of monomer containing hydroxyl group (M)}}}{\text{Total weight (g) of monomers used}} \times 1000$$

In the case where at least two monomers containing hydroxyl group are used, "molecular weight of monomer containing hydroxyl group" in the above equation represents the weight average molecular weight of the monomers.

The use of acrylic resins having a softening point of lower than 65°C reduces the resistance to blocking, whereas those having a softening point higher than 130°C fail to produce smooth surfaced coating film. Preferable softening point of the acrylic resin to be used is in the range of 70° to 115°C. Further if the acid value of the acrylic resin to be used is below 5, the resulting coating will be low in flexibility, solvent resistance and curing properties. Conversely, if it is higher than 20, the particles of the composition will be melted, permitting hardening reaction to take place before the coating film is formed, impairing the fluidity of the film and making it impossible to obtain a coating film having smooth and glossy coating surface. In addition, popping will occur markedly. Thus, preferable acid value of the acrylic resin is in the range of 7 to 19. If the amount of free hydroxyl group of the acrylic resin to be used is less than 0.4 mol per kilogram of resin, the absolute number of the crosslinkable functional groups is insufficient, which deteriorates the curing properties of the coating film. Conversely, if it is more than 2.0 mols per kilogram of the resin, the compatibility of the resin with alkyletherified methylolmelamine will be impaired and the coating formed will be low in flexibility and gloss. Preferable amount of the free hydroxyl group is in the range of 0.6 to 1.85 moles per kilogram of the resin.

The acrylic resins to be used in this invention are homopolymers of acrylic monomers and copolymers containing at least 50 percent by weight of acrylic monomers. The latter includes copolymers of at least two of acrylic monomers and copolymers of acrylic monomers with other polymerizable vinyl monomers.

The acrylic monomers to be used in this invention are, for example, acrylic acid, methacrylic acid and esters thereof having or not having hydroxyl group within the molecule. Examples of esters to be used are methyl 2-hydroxymethyl, ethyl, 2-hydroxyethyl, propyl, 2-hydroxypropyl, butyl, iso-butyl, tert-butyl, cyclohexyl, 2-ethylhexyl and lauryl esters of acrylic or methacrylic acid and like alkyl esters. Other polymerizable monomers to be copolymerized with the acrylic monomers include various vinyl monomers such as styrene, vinyl toluene, crotonic acid, itaconic acid, maleic acid, etc.

The polymerization of these monomers may be conducted by a usual method in the presence of an ordinary radical polymerization initiator. Examples of the initiator are benzoyl peroxide, lauroyl peroxide, t-butyl peroxybenzoate, di-t-butyl peroxide, di-t-butyl hydroperoxide, azobisisobutyronitrile, azobisisovaleronitrile, etc. In the case where the softening point is to be controlled by varying the molecular weight, a chain transfer agent such as lauryl mercaptan, t-dodecyl mercaptan or the like may be used in an amount of up to 5 percent by weight based on the total weight of the monomers. The polymerization may be conducted by solution polymerization, bulk polymerization, suspension polymerization, emulsion polymerization, or like known method, among which solution polymerization is the most preferable. Although solution polymerization requires a solvent for removing step after the completion of polymerization, this method is easy to conduct and facilitates the control of molecular weight and is therefore one of suitable methods to prepare the acrylic resin to be used in this invention. Copolymerization by solution polymerization is conducted in a usual manner at a temperature of 60° to 130°C in a solvent boiling at about 60° to 180°C and capable of dissolving the monomers and the resulting polymer, using 0.5 to 10 percent by weight of radical polymerization initiator based on the total amount of the monomers used. Subsequently, the solvent is removed at a temperature from the polymerizing temperature to 150°C, whereby an acrylic resin will be obtained which contains up to 1 percent by weight of the solvent.

According to this invention, it is essential to conjointly use etherified product of hexamethylolmelamine specified before and the acrylic resin having the properties specified above in the proportion of 4 to 20 percent by weight of the former to 96 to 80 percent by weight of the latter, preferably in the ratio of 5 to 15 percent by weight of the former to 95 to 85 percent by weight of the latter. If the amount of the etherified product of hexamethylolmelamine is less than 4 percent by weight, low flexibility and solvent resistance will result. Conversely, if it is over 20 percent by weight, the particles of the powder coating composition tend to cohere, rendering the powder coating composition no longer serviceable as such.

The powder coating composition of this invention may further incorporate therein usual pigments for coating purposes, anticissing agent, leveling agent, etc. The pigments to be used include coloring pigment and extender pigment. Examples of the coloring pigment are titanium dioxide, lead white, lithopone, zinc white, red iron oxide, red lead, vermillion, cadmium red, molybudenum red, cuprous oxide, chrome yellow, zinc chromate, chrome green, Toluidine Red, copper-Phthalocyanine Blue, copper-Phthalocyanine Green, etc. Examples of the extender pigment are calcium carbonate, talc, clay, etc. Examples of the leveling agent are ester gum, silicon oil, etc.

The powder coating composition of this invention is prepared by a usual method. For example, the etherified product of hexamethylolmelamine, acrylic resin and a suitable solvent are mixed together uniformly, along with pigment, anticissing agent, leveling agent, and the like as desired, at a temperature of about 80° to 140°C, preferably about 90° to 130°C by two or three rolls of the heating type, extruder or like suitable kneader, and the solvent is then removed from the mixture.

Given below are reference examples showing the processes for preparing the etherified product of hexamethylolmelamine and acrylic resin and examples of this invention, in which the parts and percentages are all by weight.

REFERENCE EXAMPLE 1

Preparation of etherified product 1

Into a 1-liter three-necked flask equipped with a stirrer and a device for removing the byproduct of methanol were placed 390 parts (1 mol) of Cymel No. 300 (hexakismethoxymethylmelamine having a purity of 95 to 97 percent and produced by American Cyanamid Co., same as hereinafter), 295 parts (2.5 mols) of ethylene glycol monobutyl ether and 0.67 part of 60 percent aqueous solution of nitric acid. The reaction system was progressively heated to a temperature of 60°C and, at the same time, the pressure within the system was reduced to 50 to 60 mm Hg. The mixture was made to react at 60°C for 3 hours while methanol resulting from the reaction as a by-product was being removed. After completion of the reaction, the reaction mixture was neutralized with 30 percent aqueous solution of caustic soda to a pH of 8.2, and the neutralized liquid was heated to 140°C with the interior of the system maintained at a reduced pressure of 5 mm Hg for concentration to remove the unreacted ethylene glycol monobutyl ether. The resulting concentrate was filtered to remove the neutralized salt and to obtain a reaction product in the form of a transparent consistent liquid (solids: 99.5%), which was found to have a viscosity of R (25°C) by GardnerHoldt bubble viscometer. To determine the chemical structure of the product, it was decomposed with phosphoric acid and analyzed by gas chromatography. At a result, the product was found to be contained 1.0 butoxyethyl group per melamine nucleus but hardly any free methylol group.

REFERENCE EXAMPLES 2 TO 22

Preparation of etherified products 2 to 22

Reactions were conducted in the same manner as in Reference Example 1 using the compositions listed in Table 1 below to prepare etherified products 2 to 22. The reaction temperature and reaction time were as given in Table 1, which also shows the properties of the etherified products obtained.

The etherified products 1 to 10 in Table 1 are all alkyletherified methylolmelamines prepared by subjecting Cymel No. 300 and ethylene glycol monoalkyl ether to ether exchange reaction. Among these, the etherified products 1 to 5, and the etherified products 7 to 9 are alkyletherified methylolmelamines according to this invention, whereas the etherified products 6 and 10 are alkyletherified methylolmelamines other than those of this invention (comparison samples). But these 6 and 10 can be used in this invention in the mixture of the other etherified products. Further the etherified products 11 to 22 are those obtained by etherifying Cymel No. 300 with alcohol (comparison samples).

Table 1

| Material used | Etherified product | | | | | | | | |
|---|---|---|---|---|---|---|---|---|---|
| | 2 | 3 | 4 | 5 | 6 | 7 | 8 | 9 | 10 |
| Cymel No. 300 (parts) | 390 (1 mol) | Same | Same | Same | Same | Same | Same | Same | Same |
| Ethylene glycol monomethyl ether (parts) | 190 (2.5 mols) | | | | 380 (5.0 mols) | | 76 (1 mol) | | |
| Propylene glycol monoethyl ether (parts) | | 265 (2.5 mols) | | | | 450 (5.0 mols) | | 54 (0.6 mol) | |
| Ethylene glycol monoisopropyl ether (parts) | | | 260 (2.5 mols) | | | | | 52 (0.5 mol) | |
| Propylene glycol monobutyl ether (parts) | | | | 132 (1.0 mol) | | | 177 (1.5 mols) | | 59 (0.5 mol) |
| 60% Nitric acid (parts) | 0.67 | 0.60 | 0.70 | 3.5 | 2.7 | | | | 0.20 |
| 98% Sulfuric | | | | | | | | | |

Table 1-continued

| Material used | Etherified product | | | | | | | | |
|---|---|---|---|---|---|---|---|---|---|
| | 2 | 3 | 4 | 5 | 6 | 7 | 8 | 9 | 10 |
| acid (parts) | | | | 0.35 | | | | | |
| 35% Hydrochloric acid (parts) | | | | | | | | 1.1 | |
| Phosphoric acid (parts) | | | | | | | 0.75 | | |
| Reaction temperature (°C) | 50 | 55 | 55 | 50 | 60 | 50 | 80 | 50 | 50 |
| Reaction time (hours) | 3.5 | 3.5 | 3.5 | 2.5 | 7.0 | 5.0 | 2.0 | 4.0 | 2.0 |
| Bubble viscosity | U | T | T-S | X | L | O | S | V-U | Z |
| Average number of R″OCHCH$_2$O— group per melamine nucleus | 1.1 | 1.3 | 1.4 | 0.6 | 3.7 | 2.4 | 1.7 | 0.8 | 0.2 |
| Solids (%) | 99.7 | 99.3 | 99.4 | 99.8 | 99.1 | 99.3 | 99.5 | 99.8 | 99.9 |

| Material used | Etherified product | | | | | | | | | | |
|---|---|---|---|---|---|---|---|---|---|---|---|
| | 11 | 12 | 13 | 14 | 15 | 16 | 17 | 18 | 19 | 20 | 21 | 22 |
| Cymel No. 300 (parts) | 390 (1 mol) | Same | Same | Same | Same | Same | Same | Same | Same | Same | Same | Same |
| Ethanol (parts) | 92 (2 mols) | | | | | | | | | | | |
| Isopropanol (parts) | | 150 (2.5 mols) | | | | | | | | | | |
| n-Butanol (parts) | | | 148 (2 mols) | 185 (2.5 mols) | | | | | | | | |
| sec-Butanol (parts) | | | | | 185 (2.5 mols) | | | | | | | |
| Amyl alcohol (parts) | | | | | | 176 (2 mols) | | | | | | |
| Isoamyl alcohol (parts) | | | | | | | 220 (2.5 mols) | | | | | |
| n-Hexanol (parts) | | | | | | | | 204 (2 mols) | | | | |
| n-Octanol (parts) | | | | | | | | | 325 (2.5 mols) | 390 (3.0 mols) | | |
| 2-Ethylhexanol (parts) | | | | | | | | | | | 325 (2.5 mols) | |
| Lauryl alcohol (parts) | | | | | | | | | | | | 465 (2.5 mols) |
| 60% Nitric acid (parts) | 0.50 | 0.75 | 0.50 | 0.75 | 0.75 | 0.60 | 0.80 | 0.75 | 0.75 | 0.85 | 1.05 | 1.25 |
| Reaction temperature (°C) | 50 | 50 | 50 | 50 | 50 | 50 | 55 | 55 | 55 | 55 | 50 | 55 |
| Reaction time (hours) | 3.5 | 3.5 | 4.0 | 4.0 | 4.0 | 3.5 | 3.5 | 3.5 | 3.5 | 4.0 | 3.5 | 4.0 |
| Bubble viscosity | Z-1 | W | W | R' | W | V | U-V | T | R-S | N | T | Q |
| Average number of RO- group per melamine nucleus | 1.2 | 0.9 | 1.1 | 1.8 | 0.9 | 1.0 | 0.9 | 1.2 | 1.2 | 2.1 | 1.0 | 1.1 |
| Solids (%) | 99.9 | 99.8 | 99.8 | 99.5 | 99.7 | 99.7 | 99.6 | 99.4 | 99.3 | 99.0 | 99.1 | 98.8 |

REFERENCE EXAMPLE 23

Preparation of etherified product 23.

Into the same flask as in Reference Example 1 were placed 390 parts (1 mol) of Cymel No. 300, 250 parts (2.5 mols) of cyclohexanol and 0.67 part of 60 percent aqueous solution of nitric acid. The reaction system was progressively heated to a temperature of 55°C, with the pressure within the system reduced to 50 to 60 mm Hg. The mixture was made to react at 55°C for 5 hours while methanol resulting from the reaction as a by-product was being removed. After completion of the reaction, the reaction mixture was neutralized with 30 percent aqueous solution of caustic soda to a pH 8.0, and the neutralized liquid was heated to about 140°C with the interior of the system maintained at a reduced pressure of 5 mm Hg for concentration to remove the unreacted cyclohexanol. The resulting concentrate was filtered to remove the neutralized salt and to obtain a reaction product in the form of a transparent consistent liquid (solids: 99.5%), which was found to have a viscosity of Z - 3 (25°C) by Gardner-Holdt bubble viscometer. To determine the chemical structure of the product, it was decomposed with phosphoric acid and analyzed by gas chromatography. At a result, the product was found to be contained 1.0 cyclohexanoxy group per melamine nucleus but hardly any free methylol group.

REFERENCE EXAMPLES 24 TO 27

Preparation of etherified products 24 to 27.

The same procedures as in Reference Example 23 was followed except for the conditions listed in Table 2 below with respect to the amount of cyclohexanol, kind and amount of acid catalyst, reaction temperature and reaction time, whereby four kinds of etherified products 24–27 were obtained. The properties of the products are also listed in Table 2.

Table 2

| Material used and reaction conditions | | 24 | Etherified product 25 | 26 | 27 |
|---|---|---|---|---|---|
| Cymel No. 300 (parts) | | 390 (1.0 mol) | Same | Same | Same |
| Cyclohexanol (parts) | | 100 (1.0 mol) | 350 (3.5 mols) | 500 (5.0 mols) | 50 (0.5 mol) |
| Acid catalyst | 60% Aq. soln. of nitric acid (parts) | | | 3.0 | 0.2 |
| | 98% Aq. soln. of sulfuric acid (parts) | | 1.7 | | |
| | Phosphoric acid (parts) | 0.5 | | | |
| Reaction temperature (°C) | | 55 | 60 | 60 | 50 |
| Reaction time (hr.) | | 53 | 5 | 55 | 3 |
| Bubble viscosity | | Z – 5 | X | U | Z – 6 |
| Solids (%) | | 99.5 | 99.0 | 99.2 | 99.6 |
| Number of cyclohexanoxy group per melamine nucleus | | 0.6 | 2.6 | 3.5 | 0.2 |

REFERENCE EXAMPLE 28

Preparation of acrylic resin A

Into a two-liter four-necked flask equipped with a reflux condenser, stirrer and dropping funnel was placed 800 parts of toluene, which was heated at 90° to 100°C while introducing nitrogen gas into the flask. A mixture of 120 parts of 2-hydroxypropyl methacrylate, 40 parts of butyl acrylate, 624 parts of ethyl methacrylate, 16 parts of acrylic acid and 10 parts of benzoyl peroxide previously placed into the dropping funnel was added dropwise, over a period of 2 hours, to the toluene maintained at the above temperature. Further at the same temperature, a solution mixture of 1 part of benzoyl peroxide and 10 parts of toluene was added to the mixture dropwise every hour, three times. (The catalyst thus added dropwise will hereinafter be referred to as "additional catalyst."). After keeping the resulting mixture at 90° to 100°C for three hours, the condenser was switched to reflux condenser and the temperature of the contents was slowly elevated to 120°C while permitting the solvent and unreacted monomers to flow out of the system. When about 60 percent of the solvent used had been discharged, the reaction product was left to stand at 120° to 130°C at a reduced pressure of about 50 to 200 mm Hg for 4 hours. The product was then poured into a vat and hardened by cooling. The acrylic resin obtained (hereinafter referred to as "acrylic resin A") contained 0.8 percent of residual solvent and had a softening point of 86°C and an acid value of 18.5. The resin contained free hydroxyl group in an amount of 1.04 mol per kilogram of the resin.

REFERENCE EXAMPLE 29

Preparation of acrylic resin B
The following mixture was prepared:

| | |
|---|---|
| Styrene | 248 parts |
| Methyl methacrylate | 240 parts |
| Butyl methacrylate | 240 parts |
| 2-Hydroxyethyl methacrylate | 64 parts |
| Methacrylic acid | 8 parts |
| Azobisisobutyronitrile | 16 parts |

The mixture was copolymerized in a solvent mixture of 160 parts of isopropyl alcohol and 640 parts of toluene at a temperature of 100° to 110°C. As an additional catalyst, a mixture of 3 parts of azobisisobutyronitrile and 30 parts of toluene was used in three equal fractions as in Reference Example 28. The other procedures were the same as in Reference Example 28. The resulting acrylic resin (hereinafter referred to as "acrylic resin B") contained 0.7 percent of residual solvent and had a softening point of 101°C and an acid value of 7.6. The amount of free hydroxyl group contained in the resin was 0.615 mol per kilogram of the resin.

REFERENCE EXAMPLE 30

Preparation of acrylic resin C
The following mixture was prepared:

| | |
|---|---|
| Styrene | 300 parts |
| Ethyl acrylate | 200 parts |
| Ethyl methacrylate | 130 parts |
| 2-Hydroxyethyl methacrylate | 160 parts |
| Acrylic acid | 10 parts |
| t-Butyl peroxide | 12 parts |
| Toluene | 30 parts |
| t-Butyl peroxide benzoate (used as additional catalyst in three equal fractions) | 3 parts |

The mixture was copolymerized in a solvent mixture of 100 parts of butyl acetate and 700 parts of toluene at a temperature of 110° to 120°C. The other procedures were the same as in Reference Example 28. The resulting acrylic resin (hereinafter referred to as "acrylic resin C") contained 0.9 percent of residual solvent and had a softening point of 78°C and an acid value of 12.1. The amount of free hydroxyl group contained in the resin was 1.54 mols per kilogram of the resin.

REFERENCE EXAMPLE 31

Preparation of acrylic resin D
The following mixture was prepared:

| | |
|---|---|
| Ethyl methacrylate | 592 parts |
| 2-Hydroxyethyl methacrylate | 80 parts |
| 2-Hydroxypropyl methacrylate | 120 parts |
| Acrylic acid | 8 parts |
| Azobisisovaleronitrile | 12 parts |

-continued

| | |
|---|---|
| Toluene | 30 parts |
| Benzoyl peroxide (used as additional catalyst in three equal fractions) | 3 parts |

The mixture was copolymerized in a solvent mixture of 200 parts of butyl acetate and 600 parts of toluene at a temperature of 110° to 120°C. The other procedures were the same as in Reference Example 28. The resulting acrylic resin (hereinafter referred to as "acrylic resin D") contained 0.8 percent of residual solvent and had a softening point of 91°C and an acid value of 7.8. The amount of free hydroxyl group contained in the resin was 1.81 mols per kilogram of the resin.

REFERENCE EXAMPLE 32

Preparation of acrylic resin E
The following mixture was prepared:

| | |
|---|---|
| Ethyl methacrylate | 512 parts |
| Isobutyl acrylate | 100 parts |
| 2-Hydroxyethyl methacrylate | 170 parts |
| Methacrylic acid | 18 parts |
| t-Dodecyl mercaptan | 12 parts |
| Benzoyl peroxide | 16 parts |
| Toluene | 30 parts |
| Benzoyl peroxide (used as additional catalyst in three equal fraction) | 3 parts |

The mixture was copolymerized in a solvent mixture of 150 parts of methyl isobutyl ketone and 650 parts of toluene at a temperature of 110° to 120°C. The other procedures were the same as in Reference Example 28. The resulting acrylic resin (hereinafter referred to as "acrylic resin E") contained 0.9 percent of residual solvent and had a softening point of 70°C and an acid value of 18.2. The amount of free hydroxyl group contained in the resin was 1.63 mols per kilogram of the resin.

REFERENCE EXAMPLE 33

Preparation of acrylic resin F
The following mixture was prepared:

| | |
|---|---|
| Styrene | 720 parts |
| 2-Hydroxyethyl acrylate | 64 parts |
| Acrylic acid | 16 parts |
| t-Butyl peroxide benzoate | 12 parts |
| Toluene | 12 parts |
| t-Butyl peroxide benzoate (used as additional catalyst in three equal fractions) | 3 parts |

The mixture was copolymerized in 800 parts of toluene at a temperature of 110° to 120°C. The other procedures were the same as in Reference Example 28. The resulting acrylic resin (hereinafter referred to as "acrylic resin F") contained 0.7 percent of residual solvent and had a softening point of 114°C and an acid value of 18.3. The amount of free hydroxyl group contained in the resin was 0.615 mol per kilogram of the resin.

REFERENCE EXAMPLE 34

Preparation of acrylic resin G (comparison acrylic resin)
The following mixture was prepared:

| | |
|---|---|
| Styrene | 200 parts |
| Ethyl acrylate | 200 parts |
| Ethyl methacrylate | 150 parts |
| 2-Hydroxyethyl methacrylate | 240 parts |
| Acrylic acid | 10 parts |
| Benzoyl peroxide | 24 parts |
| t-Dodecyl mercaptan | 24 parts |
| Toluene | 60 parts |
| Benzoyl peroxide (used as additional catalyst in three equal fractions) | 6 parts |

The mixture was copolymerized in a solvent mixture of 100 parts of isopropanol and 700 parts of toluene at a temperature of 110° to 120°C. The other procedures followed for reaction and removal of solvent and the conditions involved were the same as in Reference Example 28. The resulting acrylic resin (hereinafter referred to as "acrylic resin G") contained 0.8 percent of residual solvent and had a softening point of 60°C and an acid value of 13.7. The amount of free hydroxyl group contained in the resin was 2.31 mols per kilogram of the resin.

REFERENCE EXAMPLE 35

Preparation of acrylic resin H (comparison acrylic resin)
The following mixture was prepared:

| | |
|---|---|
| Styrene | 287 parts |
| Ethyl acrylate | 200 parts |
| Ethyl methacrylate | 130 parts |
| 2-Hydroxyethyl methacrylate | 160 parts |
| Acrylic acid | 23 parts |
| Benzoyl peroxide | 12 parts |
| Toluene | 30 parts |
| Benzoyl peroxide (used as additional catalyst in three equal fractions) | 3 parts |

The mixture was copolymerized in a solvent mixture of 650 parts of toluene and 150 parts of isopropanol at a temperature of 110° to 120°C. The other procedures were exactly the same as in Reference Example 28. The resulting acrylic resin (hereinafter referred to as "acrylic resin H") contained 0.7 percent of residual solvent and had a softening point of 75°C and an acid value of 24.4. The amount of free hydroxyl group contained in the resin was 1.54 mols per kilogram of the resin.

REFERENCE EXAMPLE 36

Preparation of acrylic resin I (comparison acrylic resin)
The following mixture was prepared:

| | |
|---|---|
| Ethyl methacrylate | 637 parts |
| Butyl acrylate | 40 parts |
| 2-Hydroxyethyl methacrylate | 120 parts |
| Methacrylic acid | 3 parts |
| Azobisisobutyronitrile | 15 parts |
| Butyl acetate | 30 parts |
| Azobisisobutyronitrile (used as additional catalyst equal fractions) | 3 parts |

The mixture was copolymerized in a solvent mixture of 700 parts of toluene and 100 parts of butyl acetate at a temperature of 110° to 120°C. The other procedures were the same as in Reference Example 28. The resulting acrylic resin (hereinafter referred to as "acrylic resin I") contained 0.8 percent of residual solvent and had a softening point of 83°C and an acid value of 2.6.

The amount of free hydroxyl group contained in the resin was 1.15 mols per kilogram of the resin.

REFERENCE EXAMPLE 37

Preparation of acrylic resin J (comparison acrylic resin)

The following mixture was prepared:

| | |
|---|---|
| Styrene | 260 parts |
| Methyl methacrylate | 240 parts |
| Butyl methacrylate | 258 parts |
| 2-Hydroxypropyl methacrylate | 32 parts |
| Acrylic acid | 10 parts |
| t-Butyl peroxide benzoate | 15 parts |
| Toluene | 30 parts |
| t-Butyl peroxide benzoate (used as additional catalyst in three equal fractions) | 3 parts |

The mixture was copolymerized in 800 parts of toluene at a temperature of 110° to 120°C. The other procedures were the same as in Reference Example 28. The resulting acrylic resin (hereinafter referred to as "acrylic resin J") contained 0.8 percent of residual solvent and had a softening point of 102°C and an acid value of 11.8. The amount of free hydroxyl group contained in the resin was 0.28 mol per kilogram of the resin.

REFERENCE EXAMPLE 38

Preparation of acrylic resin K (comparison acrylic resin)

The following mixture was prepared:

| | |
|---|---|
| Styrene | 628 parts |
| 2-Hydroxymethacrylate | 160 parts |
| Methacrylic acid | 12 parts |
| Azobisisovaleronitrile | 5 parts |
| Azobisisovaleronitrile | 9 parts |
| n-Propylacetate (used as additional catalyst in three equal fractions) | 90 parts |

The mixture was copolymerized in a solvent mixture of 200 parts of n-propylacetate and 600 parts of toluene at a temperature of 90° to 100°C. The other procedures were the same as in Reference Example 28. The resulting acrylic resin (hereinafter referred to as "acrylic resin K") contained 0.9 percent of residual solvent and had a softening point of 141°C and an acid value of 9.7. The amount of free hydroxyl group contained in the resin was 1.54 mols per kilogram of the resin.

EXAMPLES

Each of the etherified products 1–27 (including the comparison samples) and one of the acrylic resins obtained in Reference Examples were mixed together as shown in Table 3 below to obtain a composition, to which were added 50 parts of titanium dioxide pigment and 1.5 parts of ketone resin of the cyclohexane type (trade mark: "ARON KR", product of Mitsuitoatsu Co., Ltd., Japan) serving as a leveling agent. The resulting composition was uniformly mixed and melted at 100°C over a period of 20 minutes by an experimental heat roll mill having a roll diameter of 8.8 cm. Subsequently, the molten mixture was pulverized by a hammer mill into a fine powder, which was screened with a 100-mesh sieve to obtain a pigmented powder coating composition.

Table 3

| Example or Comparison Example | Acrylic resin Kind | Parts by weight | Etherified product Kind | Parts by weight |
|---|---|---|---|---|
| Example 1 | A | 90 | 1 | 10 |
| 2 | A | 90 | 2 | 10 |
| 3 | A | 90 | 3 | 10 |
| 4 | A | 90 | 4 | 10 |
| 5 | A | 90 | 5 | 10 |
| 6 | E | 95 | 7 | 5 |
| 7 | D | 85 | 8 | 15 |
| 8 | A | 80 | 9 | 20 |
| 9 | A | 90 | 6/10 | 5/5 |
| 10 | B | 90 | Cymel No. 300/7 | 5/5 |
| 11 | F | 90 | 1 | 10 |
| 12 | C | 90 | 1 | 10 |
| 13 | A | 90 | 23 | 10 |
| 14 | A | 90 | 24 | 10 |
| 15 | D | 90 | 25 | 10 |
| 16 | A | 95 | 23 | 5 |
| 17 | A | 80 | 23 | 20 |
| 18 | B | 90 | 23 | 10 |
| 19 | C | 90 | 23 | 10 |
| 20 | E | 90 | 25/27 | 5/5 |
| 21 | F | 90 | Cymel No. 300/26 | 5/5 |
| 22 | A | 90 | 26 | 10 |
| 23 | A | 90 | 27 | 10 |

| Comparison Example | Acrylic resin Kind | Parts by weight | Etherified melamine Kind | Parts by weight |
|---|---|---|---|---|
| Comp. Ex. 24 | A | 90 | 6 | 10 |
| 25 | A | 90 | 10 | 10 |
| 26 | A | 95 | Cymel No. 300 | 5 |
| 27 | A | 90 | Cymel No. 300 | 10 |
| 28 | A | 80 | Cymel No. 300 | 20 |
| 29 | G | 90 | 1 | 10 |
| 30 | H | 90 | 1 | 10 |
| 31 | I | 90 | 1 | 10 |
| 32 | J | 90 | 1 | 10 |
| 33 | A | 97.5 | 1 | 2.5 |
| 34 | K | 90 | 1 | 10 |
| 35 | A | 90 | 11 | 10 |
| 36 | A | 90 | 12 | 10 |
| 37 | A | 90 | 13 | 10 |
| 38 | A | 90 | 14 | 10 |
| 39 | A | 90 | 15 | 10 |
| 40 | A | 90 | 16 | 10 |
| 41 | A | 90 | 17 | 10 |
| 42 | A | 90 | 18 | 10 |
| 43 | A | 90 | 19 | 10 |
| 44 | A | 90 | 20 | 10 |
| 45 | A | 90 | 21 | 10 |
| 46 | A | 90 | 22 | 10 |
| 47 | A | 80 | 11 | 20 |
| 48 | C | 90 | 11 | 10 |
| 49 | A | 95 | 19 | 5 |
| 50 | H | 90 | 22 | 10 |

Each of the pigmented powder coating composition obtained in Examples was applied to polished steel plates, 0.8 mm in thickness, by an electrostatic coating method to stepwisely varing thicknesses. The samples were baked for 30 minutes at 180°C and 200°C respectively. These samples were used for the measurement of the thickness permitting popping. Each of the pigmented powder coating composition obtained in Examples was coated to such thickness that the coating would be about 80 μ in thickness when hardened on polished mild steel plate. The samples were baked for 30 minutes at 180°C and 200°C respectively. These samples were used for the determination of the properties of the coating films. The results are given in Table 4.

Table 4

| Sample No. | Solvent-insolubles (%) | | Popping film*[1] thickness (μ) | | Gloss value | | Resistance to gasoline | | Erichsen test (mm) | | Resistance of coating comp. to blocking |
|---|---|---|---|---|---|---|---|---|---|---|---|
| | 180°C | 200°C | 180°C | 200°C | 180°C | 200°C | 180°C | 200°C | 180°C | 200°C | |
| 1 | 82.2 | 93.4 | 155 | 140 | 94 | 92 | B | HB | 7 | >7 | Good |
| 2 | 83.4 | 95.2 | 160 | 150 | 92 | 91 | B | HB | >7 | >7 | " |
| 3 | 81.2 | 91.6 | 155 | 145 | 93 | 93 | B | HB | 6.5 | >7 | " |
| 4 | 82.8 | 92.5 | 155 | 140 | 94 | 91 | B | HB | 7 | >7 | " |
| 5 | 80.3 | 90.6 | 160 | 145 | 93 | 92 | 2B | B | 5.5 | >7 | " |
| 6 | 81.7 | 92.1 | 165 | 150 | 95 | 93 | 2B | B | 5.4 | >7 | " |
| 7 | 85.2 | 95.5 | 155 | 130 | 95 | 92 | B | F | >7 | >7 | " |
| 8 | 80.1 | 91.2 | 150 | 145 | 93 | 91 | 2B | B | 5.5 | >7 | " |
| 9 | 83.4 | 94.1 | 155 | 140 | 94 | 92 | B | HB | 7 | >7 | " |
| 10 | 82.5 | 93.7 | 155 | 130 | 92 | 92 | 2B | HB | 6.3 | >7 | " |
| 11 | 80.6 | 91.1 | 160 | 150 | 93 | 94 | 2B | B | 6.5 | >7 | " |
| 12 | 84.1 | 94.8 | 150 | 125 | 92 | 91 | B | HB | >7 | >7 | " |
| 13 | 80.5 | 93.5 | 160 | 140 | 93 | 91 | B | HB | 7 | >7 | Good |
| 14 | 81.4 | 94.3 | 160 | 140 | 93 | 93 | B | HB | >7 | >7 | " |
| 15 | 79.3 | 92.8 | 150 | 135 | 94 | 92 | B | HB | 6.5 | >7 | " |
| 16 | 77.9 | 89.1 | 165 | 150 | 95 | 93 | 2B | B | 5.5 | >7 | " |
| 17 | 88.2 | 97.7 | 145 | 130 | 92 | 90 | B | F | >7 | >7 | " |
| 18 | 80.0 | 90.3 | 150 | 140 | 93 | 93 | 2B | B | 6.5 | >7 | " |
| 19 | 83.3 | 94.0 | 150 | 130 | 92 | 91 | B | HB | >7 | >7 | " |
| 20 | 82.2 | 93.7 | 155 | 140 | 94 | 92 | B | HB | 7 | >7 | " |
| 21 | 80.6 | 92.2 | 150 | 135 | 92 | 92 | 2B | HB | 6.5 | >7 | " |
| 22 | 85.2 | 93.3 | 160 | 140 | 93 | 90 | B | F | 7 | >7 | Poor |
| 23 | 63.3 | 77.2 | 120 | 110 | 90 | 92 | <6B | 5B | 0.3 | 1.5 | Good |
| 24 | 83.2 | 95.1 | 155 | 135 | 93 | 92 | B | F | 7 | >7 | Poor |
| 25 | 62.3 | 77.2 | 135 | 115 | 92 | 93 | <6B | 5B | 0.3 | 1.5 | Good |
| 26 | 55.6 | 70.1 | 110 | 75 | 83 | 61 | <6B | 5B | 0.2 | 0.6 | " |
| 27 | 60.2 | 75.3 | 75 | 55 | 64 | 40 | <6B | 5B | 0.4 | 0.8 | Good |
| 28 | 70.6 | 81.6 | 50 | <40 | 52 | 36 | 3B | B | 0.7 | 2.1 | " |
| 29 | 80.0 | 91.4 | 70 | <40 | 76 | 50 | B | F | 2.5 | 2.3 | Poor |
| 30 | 84.6 | 95.3 | 70 | 50 | 38 | 21 | HB | H | 7 | 5.7 | Good |
| 31 | 49.2 | 74.6 | 155 | 130 | 93 | 92 | <6B | 5B | 0.4 | 1.1 | " |
| 32 | 53.7 | 70.6 | 155 | 135 | 91 | 90 | <6B | 6B | 0.2 | 0.6 | " |
| 33 | 55.1 | 67.2 | 160 | 150 | 96 | 94 | <6B | 5B | 0.3 | 0.9 | " |
| 34 | 85.1 | 94.1 | 60 | 50 | 51 | 42 | B | HB | >7 | >7 | " |
| 35 | 61.7 | 79.2 | 80 | 60 | 85 | 61 | <6B | 5B | 0.5 | 1.0 | " |
| 36 | 60.8 | 77.4 | 85 | 60 | 92 | 58 | <6B | 5B | 0.4 | 0.8 | " |
| 37 | 62.3 | 78.4 | 90 | 65 | 91 | 63 | <6B | 5B | 0.5 | 0.9 | " |
| 38 | 61.9 | 81.4 | 110 | 75 | 92 | 85 | <6B | 6B | 0.3 | 1.1 | " |
| 39 | 62.1 | 78.1 | 95 | 65 | 93 | 87 | <6B | 5B | 0.6 | 0.9 | " |
| 40 | 63.4 | 79.1 | 100 | 70 | 94 | 88 | <6B | 6B | 0.7 | 0.9 | " |
| 41 | 62.5 | 78.1 | 100 | 65 | 92 | 81 | <6B | 6B | 0.6 | 0.9 | Good |
| 42 | 63.2 | 77.1 | 110 | 80 | 92 | 91 | <6B | 6B | 0.7 | 0.9 | " |
| 43 | 63.8 | 80.1 | 125 | 95 | 93 | 94 | <6B | <6B | 0.6 | 1.2 | Poor |
| 44 | 61.4 | 79.4 | 155 | 120 | 94 | 93 | <6B | <6B | 0.5 | 1.5 | " |
| 45 | 60.4 | 78.6 | 135 | 105 | 96 | 93 | <6B | <6B | 0.5 | 1.2 | " |
| 46 | 59.3 | 79.1 | 165 | 130 | 90 | 87 | <6B | <6B | 0.4 | 1.6 | " |
| 47 | 76.2 | 85.5 | 60 | 40 | 64 | 48 | 6B | 4B | 0.7 | 3.6 | Good |
| 48 | 61.4 | 78.8 | 90 | 65 | 93 | 75 | <6B | 6B | 0.3 | 0.9 | " |
| 49 | 57.2 | 72.4 | 150 | 125 | 94 | 91 | <6B | <6B | 0.2 | 0.7 | Poor |
| 50 | 83.3 | 94.8 | 60 | <40 | 52 | 41 | 2B | B | >7 | 5.3 | " |

*[1]Popping film thickness: Maximum coating film thickness which is observed no popping, the same as hereinafter.

The tests and evaluations listed in Table 4 were made according to the following methods:

Solvent-insolubles

An unpigmented powder coating composition prepared by the method shown as below was applied to a glass plate to a thickness of 2 mm by a knife coater and the coated plate was baked at a specified temperature (given in Table 4) for 30 minutes. About 0.5 g of the coating film thus cured was peeled off, placed in a cylindrical filter paper 5A (Toyo filter Paper Company Limited., Japan) with acetone as an extracting solvent and subjected to extraction for 10 hours by an extractor. The resulting residue was thereafter dried at 60°C to a constant weight with a vacuum drier. The weight of the cured coating film was measured before and after extraction to calculate the amount of solvent insolubles (in percentage) from the following equation. The result is given in Table 4.

$$\text{Solvent-insolubles (\%)} = \frac{(B+C)-D}{A} \times 100$$

wherein A is weight of sample before extraction, B is weight of filter paper after extraction, C is weight of sample after extraction and D is weight of filter paper.

The above clear powder coating composition was prepared as follow:

Each of the etherified products 1-27 and one of the acrylic resins obtained in Reference Examples were mixed together as shown in Table 3 above to obtained a composition, to which was added 1.5 parts of the leveling agent (ARON KR). The resulting composition was conducted in the same manner as in Examples.

Ericksen test:

Conducted according to JIS-Z-2247. The greater the numerical value listed, the higher is the flexibility.

Gloss value:

According to JIS-K-5400, 6.7.

Resistance to gasoline:

The test plate was immersed in gasoline at 20°C for 24 hours and then taken out, whereupon the pencil hardness of the immersed portion was measured at 20°C according to JIS-K-5400, 6.14. The higher the pencil hardness, the better is the resistance to solvent.

Resistance of coating composition to blocking:

5.0 g of the pigment powder coating composition obtained in each example was placed into a test tubu of 10 mm in diameter and left to stand at 40°C for 24 hours. If the sample returned to the original fine powdery state when thereafter taken out of the tube, it was evaluated as "good". If the resistance to blocking is good, the particles of the powder will not fuse during storage.

What we claim is:

1. A coating composition comprising 4 to 20 percent by weight of a hexamethylolmelamine derivative and 96 to 80 percent by weight of an acrylic resin, said composition being in the form of a powder having a softening point of 65 to 130°C and an acid value of 5 to 20 and containing 0.4 to 2.0 mols of free hydroxyl group per kilogram of the resin, said hexamethylolmelamine derivative being at least one of etherified products of hexamethylolmelamine which have $CH_3O-$ and RO- groups substituted for the hydroxyl group in the methylol group of hexamethylolmelamine, the average total number of the $CH_3O-$ and RO- groups being 5.5 to 6.0 per melamine nucleus, the average number of the RO- group being 0.5 to 3.0 per melamine nucleus, wherein

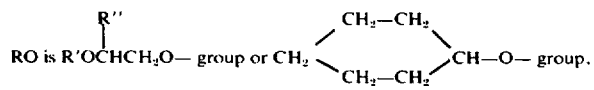

R' being an alkyl group having 1 to 4 carbon atoms and R'' being hydrogen atom or methyl group, said acrylic resin being selected from the group consisting of homopolymers of acrylic acid and esters thereof and copolymers containing at least 50 percent by weight of acrylic acid or esters thereof.

2. The powder coating composition according to claim 1, in which said RO- group is

3. The powder coating composition according to claim 2, in which said

group is $R'OCH_2CH_2O-$ group.

4. The powder coating composition according to claim 3, in which said $R'OCH_2CH_2O-$ group is $CH_3OCH_2CH_2O-$ group.

5. The powder coating composition according to claim 1, in which said RO- group is

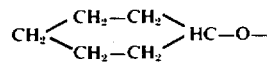

group.

6. The powder coating composition according to claim 1, in which said average number of the RO- group is 1.0 to 3.0 per melamine nucleus.

7. The powder coating composition according to claim 1, in which said acrylic resin has a softening point of 70° to 115°C and an acid value of 7 to 19, and contains 0.4 to 2.0 mols of free hydroxyl group per kilogram of the resin.

8. The powder coating composition according to claim 1, in which said composition comprises 5 to 15 percent by weight of the hexamethylolmelamine derivative and 95 to 85 percent by weight of the acrylic resin.

9. The powder coating composition according to claim 1, in which said composition further contains a pigment.

10. An article coated with a coating film obtained from the powder coating composition in claim 1.

* * * * *